United States Patent
Das et al.

(10) Patent No.: US 7,814,258 B2
(45) Date of Patent: Oct. 12, 2010

(54) PCI BUS BURST TRANSFER SIZING

(75) Inventors: Sumit Sadhan Das, Richardson, TX (US); Roy D. Wojciechowski, Round Rock, TX (US); Pradip Arunbai Thaker, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 268 days.

(21) Appl. No.: 12/177,000

(22) Filed: Jul. 21, 2008

(65) Prior Publication Data

US 2010/0017547 A1 Jan. 21, 2010

(51) Int. Cl.
*G06F 13/14* (2006.01)
*G06F 13/00* (2006.01)

(52) U.S. Cl. ............... 710/305; 710/22; 710/33; 710/62

(58) Field of Classification Search ......... 710/305–315, 710/22–39, 62; 709/245
See application file for complete search history.

(56) References Cited

U.S. PATENT DOCUMENTS

| 5,838,932 | A | * | 11/1998 | Alzien | 710/314 |
| 5,999,743 | A | * | 12/1999 | Horan et al. | 710/56 |
| 6,170,025 | B1 | * | 1/2001 | Drottar et al. | 710/48 |
| 6,418,479 | B1 | * | 7/2002 | Houssein et al. | 709/245 |
| 6,594,712 | B1 | * | 7/2003 | Pettey et al. | 710/22 |
| 6,766,398 | B2 | * | 7/2004 | Holm et al. | 710/260 |
| 6,820,164 | B2 | * | 11/2004 | Holm et al. | 710/312 |
| 2002/0152334 | A1 | * | 10/2002 | Holm et al. | 710/2 |
| 2002/0199040 | A1 | * | 12/2002 | Irwin et al. | 710/22 |
| 2005/0210163 | A1 | * | 9/2005 | Suzuki et al. | 710/22 |
| 2008/0040526 | A1 | * | 2/2008 | Suzuki et al. | 710/302 |

\* cited by examiner

*Primary Examiner*—Christopher B Shin
(74) *Attorney, Agent, or Firm*—William B. Kempler; Wade J. Brady, III; Frederick J. Telecky, Jr.

(57) ABSTRACT

Various apparatuses, methods and systems for specifying memory transaction sizes on a PCI bus are disclosed herein. For example, some embodiments of the present invention provide apparatuses for transferring data including a PCI bus, a memory map for memory transactions performed on the PCI bus, and at least one set of control registers adapted to establish at least one window within the memory map. The set of control registers contains an address range for the at least one window within the memory map and a burst transfer size for memory transactions taking place on the PCI bus that are addressed within the address range.

20 Claims, 3 Drawing Sheets

PCI BUS BURST TRANSFER SIZING

BACKGROUND OF THE INVENTION

The present invention is related to a PCI bus, and more particularly to a PCI bus in which transaction sizes may be specified.

Computer systems include a number of components that need to exchange data. For example, a typical computer system includes a processor, memory, hard drive, etc. Busses are used to connect the components in a computer system. For example, the processor and memory in a typical computer system are interconnected by a system or frontside bus. Peripheral devices such as network cards, sound cards, modems, disk controllers, etc may be connected to the computer system by a Peripheral Component Interconnect (PCI) bus. Peripheral devices in this example can access system memory across the PCI bus, through a bus bridge and across the system bus. Busses such as the PCI bus have a great affect on the apparent speed of a computer system, with multiple devices trying to communicate over a single bus at the same time and with inherent limitations of the bus design affecting data throughput.

Figure 1:
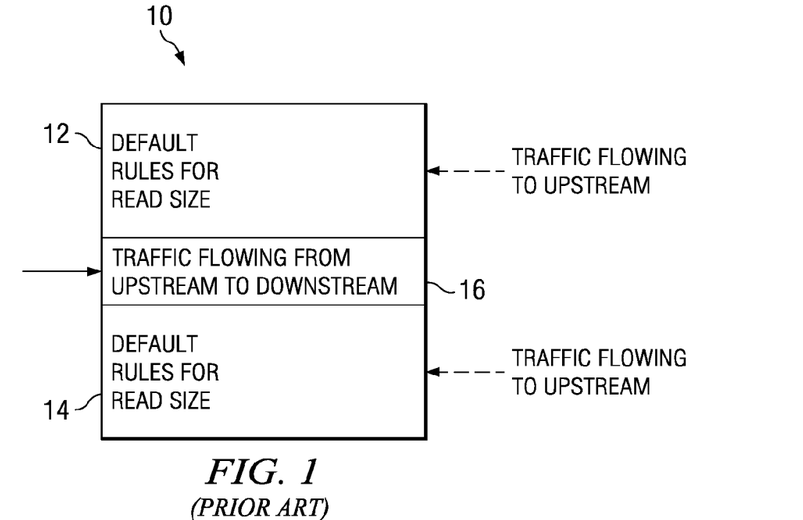
FIG. 1 illustrates a prior art memory map window for a PCI bus.
Figure 2:
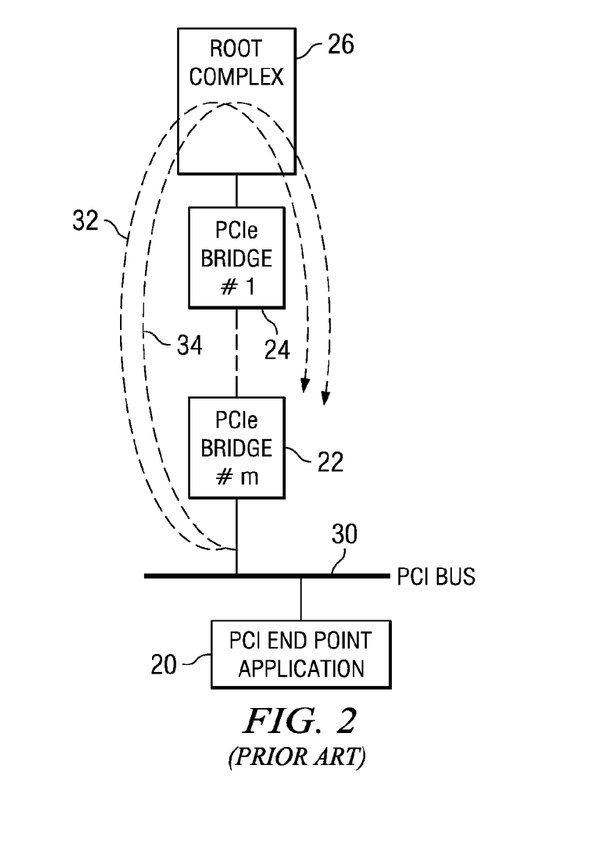
FIG. 2 is a block diagram of data being transmitted to and from a PCI endpoint application over a number of bus bridges in a prior art system.

One such limitation is that the legacy PCI bus protocol includes no notion of transaction sizing. A memory map 10 for data transactions on a PCI bus is established as shown in FIG. 1. Memory address ranges 12, 14 and 16 are set aside for data flowing upstream and downstream, and the PCI bus master is able to perform memory read transactions within the memory map 10 using FRAME#, IRDY#, AD, and CMD/BE# signals, but it cannot indicate the amount of data to be transmitted in a transaction. In many systems the PCI master 20 is behind one or more bridges 22 and 24 as illustrated in FIG. 2. When the PCI master 20 needs to read data, for example from system memory in a root complex 26, it will make a read request. The read request works its way up the hierarchy with a latency penalty at each bridge 22 and 24. When the request reaches a bridge 22 to a non-PCI protocol (for example PCI-Express) the bridge 22 will have to guess at the amount of read data to request. The guess is implementation specific with the only hint on the PCI bus 30 being the use of Memory Read, Memory Read Line, or the Memory Read Multiple commands. These commands give very little guidance regarding the actual amount of data to read when the request wants many cachelines of data. The completer 26 of the read request will return the amount of data that was "guessed" by the bridge 22. The data will pass down the hierarchy to the PCI master 20 again incurring a latency delay at each bridge 22 and 24 in the path.

If the read data returned was too large the excess data has to be discarded. The PCI bridge specification requires that all read data not consumed by the master 20 in one PCI bus transfer be discarded. For example if the PCI master 20 wanted A words of data and the "guessed" amount of data was B (where B is greater than A) words then the data that the PCI master did not want (B−A words) will be discarded by the bridge 22. The discarded data will have wasted bandwidth on the path from the source of the data 26 to the final bridge 22 before the PCI master 20.

If the read data returned was too little the PCI master 20 will have to make multiple reads to obtain the needed data. Each read will incur the latency of the read request going to the source of the data and the delay of the data being returned to PCI master 20. When there are multiple PCI masters wishing to read data simultaneously the penalties become even worse. For example, in a multi-agent system on a PCI bus 30, all the agents (e.g., 20) try to access the bus 30 and an arbitrator attempts to give each agent a share in round robin fashion. Thus, an agent 20 may require multiple requests 32 and 34 before the required data is obtained. Each read will incur the loop latency penalty of the request 32 and 34 going up the hierarchy and the read data flowing down back to the PCI master 20. In many systems the latency penalty of the request going up and the data coming down is much greater than the time it takes to transfer the data on the PCI bus 30. In this type of an environment breaking up the read into multiple requests will significantly reduce the read throughput.

Thus, for at least the aforementioned reason, there exists a need in the art for an improved PCI bus.

BRIEF SUMMARY OF THE INVENTION

The present invention is related to a PCI bus, and more particularly to a PCI bus in which transaction sizes may be specified.

Various apparatuses, methods and systems for specifying memory transaction sizes on a PCI bus are disclosed herein. For example, some embodiments of the present invention provide apparatuses for transferring data including a PCI bus, a memory map for memory transactions performed on the PCI bus, and at least one set of control registers adapted to establish at least one window within the memory map. The set of control registers contains an address range for the at least one window within the memory map and a burst transfer size for memory transactions taking place on the PCI bus that are addressed within the address range.

Other instances of the aforementioned apparatuses include a second bus with a non-PCI protocol in which a size for memory transactions may be specified, and a bridge device between the PCI bus and the second bus. The bridge device specifies the size for the memory transactions on the second bus based at least in part on values stored in the at least one set of control registers.

Other embodiments of the present invention provide methods for transferring data on a PCI bus, including establishing a memory map having at least one window. The window has a range of memory addresses within the memory map. The methods also include configuring a memory transaction size for memory transactions addressed within the at least one window, receiving a memory transaction on the PCI bus, and transferring an amount of data on the PCI bus based at least in part on the memory transaction size for the at least one window.

Other embodiments of the present invention provides systems such as a computer system having a PCI bus, a plurality of PCI bus burst transfer size control registers, a second bus and a bridge device between the PCI bus and the second bus. The plurality of PCI bus burst transfer size control registers are adapted to establish a size of burst transfer operations taking place within an address range of a memory map for the PCI bus. The plurality of burst transfer size control registers include a base address register specifying a base address for the address range, an upper limit register specifying an upper address limit for the address range, and a burst size control register. The burst size control register includes a burst size multiplier, a transfer mode flag, and an enable bit. The transfer mode flag selects between a fixed data size to be multiplied by the burst size multiplier or a cache line size to be multiplied by the burst size multiplier. The enable bit enables or disables burst transfer size specifications on the PCI bus. The bridge device between the PCI bus and the second bus is adapted to specify read transaction sizes to the second bus for memory transactions passing through the bridge device from the PCI bus to the second bus, based at least in part on the contents of the plurality of PCI bus burst transfer size control registers.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

The drawings and description, in general, disclose various embodiments of a PCI bus in which transaction sizes may be specified. One or more windows may be specified in a memory map for a PCI bus with memory transaction sizes defined for each window. Read transactions on the PCI bus that are addressed within the windows of the memory map thus fetch the predefined amount of data in each burst. This enables applications to enhance their performance according to need and traffic on the PCI bus can be tuned to serve a particular application. An application can program low bandwidth intensive traffic to one particular window with a smaller transfer size and high bandwidth intensive traffic to another window. Wastage is thus minimized in both transaction windows and PCI Bus efficiency is increased.

The present invention also allows an application to increase the burst size for a given read request, so the PCI request engine can pipeline data fetching which will reduce the turnaround latency for a given read request. In legacy PCI bus protocols, the request engine must guess how much data needs to be fetched, so burst size is not controllable and the PCI application ends up having multiple serial sequentially addressed read requests, each of which incurs a penalty of system turnaround latency. By enabling an application to choose the burst size, the present invention ensures that after the initial packet latency a read request will reduce or eliminate multiple serial read requests, thus completing read transactions more quickly and minimizing the idle time on the PCI Bus.

Figure 3:
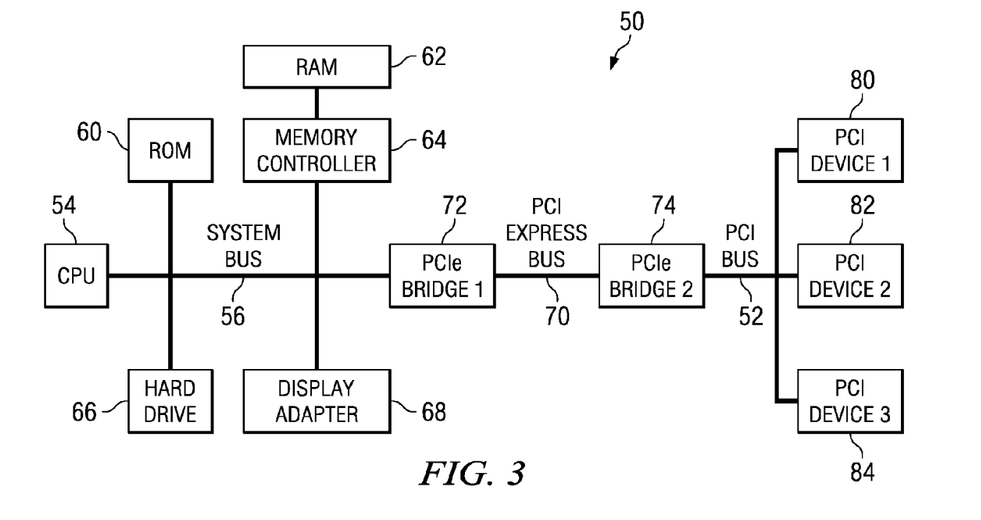
FIG. 3 depicts a computer system in which a PCI bus in accordance with some embodiments of the present invention may be used.

Before describing the PCI bus with burst transfer sizing in more detail, an exemplary computer system in which the PCI bus with burst transfer sizing may be utilized will be described. Note, however, that the PCI bus with burst transfer sizing is not limited to use in any particular system. Turning now to FIG. 3, one exemplary computer system 50 in which the PCI bus with burst transfer sizing 52 may be utilized is illustrated. The computer system 50 includes a central processing unit (CPU) 54 connected by a system bus 56 (also referred to as a frontside bus) to devices such as a read-only memory (ROM) 60, a random access memory (RAM) 62 and memory controller 64, a hard drive 66 and input/output (I/O) devices such as a display adapter 66 and keyboard (not shown), etc. The computer system 50 may include various other busses such as a PCI Express bus 70 connected to the system bus 56 by a PCIe bridge 72 and the PCI bus 52 connected to the PCI Express bus 70 by another PCIe bridge 74. Peripheral devices 80, 82 and 84 such as communications adapters, external storage devices, scanners and printers, etc may be connected to the PCI bus 52. Note that the configuration and contents of the computer system 50 are purely exemplary and may be adapted as desired as is well known in the art. In operation, the CPU 54 in the computer system 50 executes instructions stored in binary format in the ROM 60, on the hard drive 66 and in the RAM 62, causing it to manipulate data stored in the RAM 62 to perform useful functions. Peripheral devices (e.g., 80, 82 and 84) may read and write data to the RAM 62 or other devices in the computer system 50 via the PCI bus 52 and other busses (e.g., 70 and 56) in the system. As will be described in more detail below, by providing windows in the memory map of the PCI bus 52 having configurable burst sizes, data transfers in the computer system 50 are made much more efficient.

Figure 4:
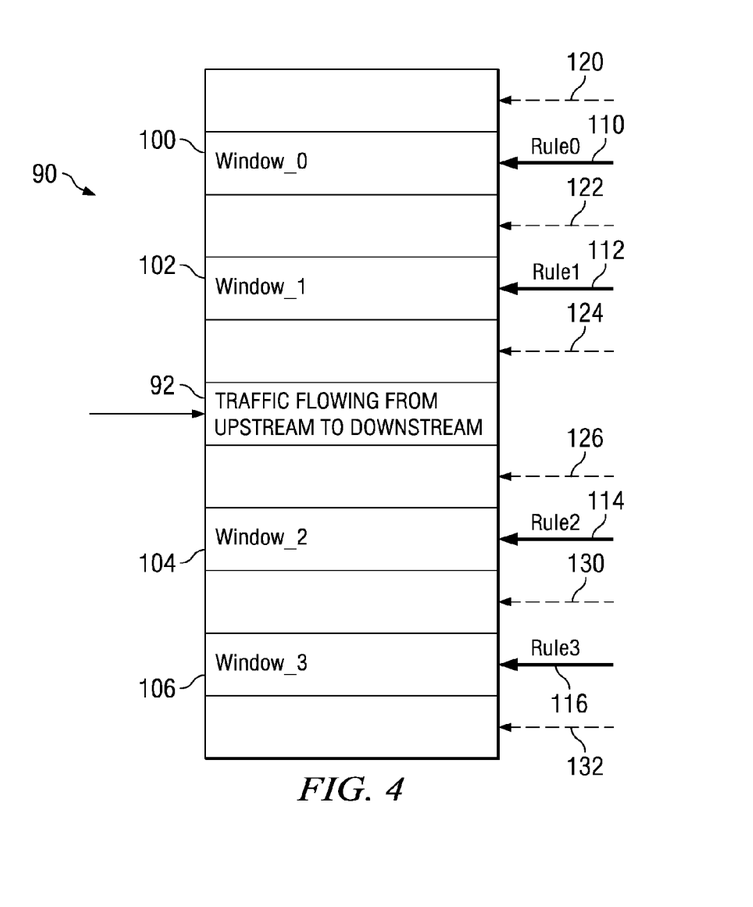
FIG. 4 illustrates a memory map window of a PCI bus with configurable transaction size windows.

Turning now to FIG. 4, the memory map 90 for a PCI bus according to one particular embodiment of the invention will be discussed. A block 92 or address range is established for downstream traffic, with the size of memory transactions specified and controlled by the source of data. (This size in most cases is originally established by the burst transfer sizing mechanism disclosed herein, based on the addressing of a read operation within preconfigured windows in the memory map 90.) One or more windows 100, 102, 104 and 106 are established within the memory map 90 for upstream traffic, or read operations flowing from the PCI bus associated with the memory map 90 to an upstream device via the PCI bus and other busses. Rules 110, 112, 114 and 116 are established for the windows 100, 102, 104 and 106, respectively, establishing the sizes for burst transfer operations addressed within the windows 100, 102, 104 and 106. Address ranges 120, 122, 124, 126, 130 and 132 within the memory map 90 may be provided that do not lie within the windows 100, 102, 104 and 106 if desired, with read transactions addressed within these non-window address ranges 120, 122, 124, 126, 130 and 132 functioning in a traditional manner with no size specified. In other particular embodiments, the entire address range of the memory map 90 may be divided into and fall within windows (e.g., 100, 102, 104 and 106) having configured burst transfer sizes. Note also that the number of windows in a PCI bus memory map may be adjusted as desired, ranging from a single window, the four windows 100, 102, 104 and 106 of one particular embodiment, or any desired number of windows.

Figure 5:
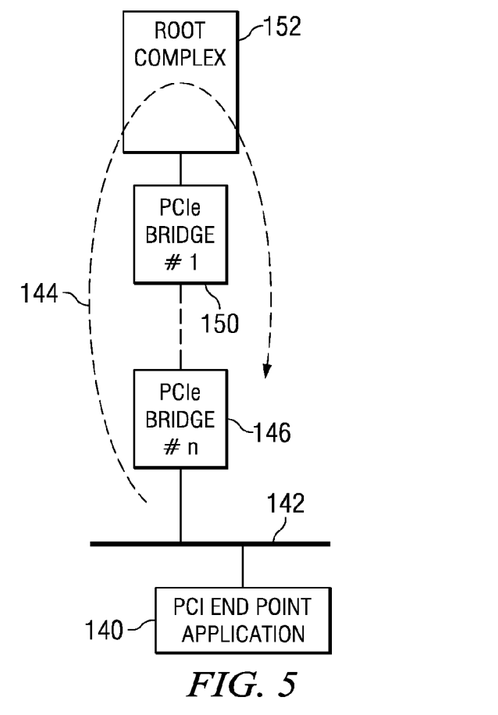
FIG. 5 is a block diagram of data being transmitted to and from a PCI endpoint application over a number of bus bridges in accordance with some embodiments of the present invention.

Turning now to FIG. 5, a read operation originating from a PCI end point application 140 on a PCI bus 142 will be described. In contrast to the read transaction of FIG. 2 that is broken into multiple requests 32 and 34, a read request 144 that is performed in a window having a burst transfer size configured properly can be accomplished in a single operation. Thus, the request 144 only needs to navigate the hierarchy once from PCI end point application 140, across the PCI bus 142, through one or more bridges 146 and 150 to a data source 152 and back. The total latency of the multiple requests 32 and 34 in the legacy PCI bus 30 of FIG. 2 can be calculated as the number of requests to be made multiplied by the time to make the loop times the number of read segments to be fetched, plus the idle cycles to be drained between read segments times the time required to drain idle cycles. In contrast, the total latency of the request 144 in the size-configurable PCI bus 142 of FIG. 5 is the loop time plus the time required to drain the idle cycles between read segments. Note that the time required to drain the idle cycles will also be much less for the case in FIG. 5, because the stream of read operations will be much more continuous without the wasted data and interrupted requests.

The rules 110, 112, 114 and 116 configuring the windows 100, 102, 104 and 106 may be established by storing values in control registers associated with the PCI bus. The structure of a set of control registers according to one particular embodiment of the invention are set forth below. The control registers may be located in a bridge device between the PCI bus and a non-PCI bus, along with address decoding logic in the bridge device that translates read operations without transfer size information on the PCI bus to read operations with transfer size information on the non-PCI bus. It is important to note that the control registers may be located in other devices on the system in other particular embodiments, and that the contents and structure of the control registers may be adapted to establish data transfer size as desired.

TABLE 1

PCI Burst Transfer Sizing Window 0

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset State | 0 | 0 | 0 | 0 | 0 | 0 | 0 | 0 | 0 | 0 | 0 | 0 | 0 | 0 | 0 | 0 |

TABLE 2

Bit Description - PCI Burst Transfer Sizing Window 0 register

| Bit | Field Name | Access | Description |
|---|---|---|---|
| 31:0 | Memory Mapped Window 0 | rw | Programmed value will provide base addr for the mapped window |

TABLE 3

PCI Burst Transfer Sizing Window Limit 0

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 4

Bit Description - PCI Burst Transfer Sizing Window Limit 0 register

| Bit | Field Name | Access | Description |
|---|---|---|---|
| 31:0 | Memory Mapped Window Limit 0 | rw | Programmed value will provide upper limit of addr for the mapped window |

TABLE 5

PCI Burst Transfer Sizing Window Control 0

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset state | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 6

Bit Description - PCI Burst Transfer Sizing Window Control 0 register

| Bit | Field Name | Access | Description |
|---|---|---|---|
| 31:8 | Rsvd | r | Rsvd, read only zero |
| 7:2 | Burst Size Multiplier | rw | Min value is 0 and max value 63, internal hardware will use min value as 1 and max value 64 |
| 1 | Mode of transfer | rw | 0-fixed mode, burst size n * 64 B where n is the value from [7:2]<br>1-n multiple of cacheline size where n is the value from [7:2] |
| 0 | Burst Transfer Sizing Window Enable | rw | 1- Window is enabled for use<br>0- Window is disabled |

TABLE 7

PCI Burst Transfer Sizing Window 1

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset State | 0 | 0 | 0 | 0 | 0 | 0 | 0 | 0 | 0 | 0 | 0 | 0 | 0 | 0 | 0 | 0 |

TABLE 8

Bit Description - PCI Burst Transfer Sizing Window 1 register

| Bit | Field Name | Access | Description |
|---|---|---|---|
| 31:0 | Memory Mapped Window 1 | rw | Programmed value will provide base addr for the mapped window |

TABLE 9

PCI Burst Transfer Sizing Window Limit 1

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 10

Bit Description - PCI Burst Transfer Sizing Window Limit 1 register

| Bit | Field Name | Access | Description |
|---|---|---|---|
| 31:0 | Memory Mapped Window Limit 1 | rw | Programmed value will provide upper limit of addr for the mapped window |

TABLE 11

PCI Burst Transfer Sizing Window Control 1

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset state | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 12

Bit Description - PCI Burst Transfer Sizing Window Control 1 register

| Bit | Field Name | Access | Description |
|---|---|---|---|
| 31:8 | Rsvd | r | Rsvd, read only zero |
| 7:2 | Burst Size Multiplier | rw | Min value is 0 and max value 63, internal hardware will use min value as 1 and max value 64 |
| 1 | Mode of transfer | rw | 0-fixed mode, burst size n * 64 B where n is the value from [7:2]<br>1-n multiple of cacheline size where n is the value from [7:2] |
| 0 | Burst Transfer Sizing Window Enable | rw | 1- Window is enabled for use<br>0- Window is disabled |

TABLE 13

PCI Burst Transfer Sizing Window 2

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset State | 0 | 0 | 0 | 0 | 0 | 0 | 0 | 0 | 0 | 0 | 0 | 0 | 0 | 0 | 0 | 0 |

TABLE 14

Bit Description - PCI Burst Transfer Sizing Window 2 register

| Bit | Field Name | Access | Description |
|---|---|---|---|
| 31:0 | Memory Mapped Window 2 | rw | Programmed value will provide base addr for the mapped window |

TABLE 15

PCI Burst Transfer Sizing Window Limit 2

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 16

Bit Description - PCI Burst Transfer Sizing Window Limit 2 register

| Bit | Field Name | Access | Description |
|---|---|---|---|
| 31:0 | Memory Mapped Window Limit 2 | rw | Programmed value will provide upper limit of addr for the mapped window |

TABLE 17

PCI Burst Transfer Sizing Window Control 2

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset state | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 18

Bit Description - PCI Burst Transfer Sizing Window Control 2 register

| Bit | Field Name | Access | Description |
|---|---|---|---|
| 31:8 | Rsvd | r | Rsvd, read only zero |
| 7:2 | Burst Size Multiplier | rw | Min value is 0 and max value 63, internal hardware will use min value as 1 and max value 64 |
| 1 | Mode of transfer | rw | 0-fixed mode, burst size n * 64 B where n is the value from [7:2]<br>1-n multiple of cacheline size where n is the value from [7:2] |
| 0 | Burst Transfer Sizing Window Enable | rw | 1- Window is enabled for use<br>0- Window is disabled |

TABLE 19

PCI Burst Transfer Sizing Window 3

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

| | Bit Number | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Reset State | 0 | 0 | 0 | 0 | 0 | 0 | 0 | 0 | 0 | 0 | 0 | 0 | 0 | 0 | 0 | 0 |

TABLE 20

Bit Description - PCI Burst Transfer Sizing Window 3 register

| Bit | Field Name | Access | Description |
|---|---|---|---|
| 31:0 | Memory Mapped Window 3 | rw | Programmed value will provide base addr for the mapped window |

TABLE 21

PCI Burst Transfer Sizing Window Limit 3

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset State | 0 | 0 | 0 | 0 | 0 | 0 | 0 | 0 | 0 | 0 | 0 | 0 | 0 | 0 | 0 | 0 |

| | Bit Number | | | | | | | | | | | | | | | |
|---|---|---|---|---|---|---|---|---|---|---|---|---|---|---|---|---|
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 22

Bit Description - PCI Burst Transfer Sizing Window Limit 3 register

| Bit | Field Name | Access | Description |
|---|---|---|---|
| 31:0 | Memory Mapped Window Limit 0 | rw | Programmed value will provide upper limit of addr for the mapped window |

TABLE 23

PCI Burst Transfer Sizing Window Control 3

| | Bit Number | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Reset state | 0 | 0 | 0 | 0 | 0 | 0 | 0 | 0 | 0 | 0 | 0 | 0 | 0 | 0 | 0 | 0 |
| | Bit Number | | | | | | | | | | | | | | | |
| | 31 | 30 | 29 | 28 | 27 | 26 | 25 | 24 | 23 | 22 | 21 | 20 | 19 | 18 | 17 | 16 |
| Reset state | 0 | 0 | 0 | 0 | 0 | 0 | 0 | 0 | 0 | 0 | 0 | 0 | 0 | 0 | 0 | 0 |

TABLE 24

Bit Description - PCI Burst Transfer Sizing Window Control 3 register

| Bit | Field Name | Access | Description |
|---|---|---|---|
| 31:8 | Rsvd | r | Rsvd, read only zero |
| 7:2 | Burst Size Multiplier | rw | Min value is 0 and max value 63, internal hardware will use min value as 1 and max value 64 |
| 1 | Mode of transfer | rw | 0-fixed mode, burst size n * 64 B where n is the value from [7:2]<br>1-n multiple of cacheline size where n is the value from [7:2] |
| 0 | Burst Transfer Sizing Window Enable | rw | 1- Window is enabled for use<br>0- Window is disabled |

The PCI Burst Transfer Sizing Window 0 register illustrated in Tables 1 and 2 stores the base address for window 0, the first window in the memory map for the PCI bus. Table 1 contains the bit numbers and reset values for the register and Table 2 describes the function and access of the register. In this particular embodiment, the register is a 32 bit read-write register that programs the base address for the window. Note that the width of the registers may be adapted as desired based on the target system. Note also that the base address may contain a physical address, logical address etc as desired.

The PCI Burst Transfer Sizing Window Limit 0 register illustrated in Tables 3 and 4 configures the size of window 0. In one particular embodiment, this register contains the length of the window. Thus, the upper address of the window can be calculated by adding the contents of this register to the contents of the burst transfer sizing register of Tables 1 and 2. In another particular embodiment, this register may contain an upper address, so that the length of the window could be calculated by subtracting the base address from the upper address.

The PCI Burst Transfer Sizing Window Control 0 register illustrated in Tables 5 and 6 establishes several rules for the first window. Bits 7-2 establish a burst size multiplier from 1 to 64, which is multiplied by a constant to set the length of read transactions that are addressed within the first window. (As with other aspects of the control registers, the length and bit position of each variable may be adapted as desired. The fields shown in the Table are purely an example of what could be used. The contents of the control registers can be any fields needed to define or control the quantity of data to be read for an address that falls into the memory window associated with the control registers.) Bit 1 establishes the transfer mode, with a value of 0 selecting a fixed mode in which the burst size multiplier (set in bits 7-2) is multiplied by a predetermined block size such as 64 bytes, or a cache line size dependent mode in which the burst size multiplier is multiplied by the size of the cache line in the system including the PCI bus. Bit 0 is an enable bit, enabling and disabling the first window for use. In one particular embodiment, setting Bit 0 to zero disables all read transactions that are addressed within the first window so that they are discarded and not passed along. In another particular embodiment, setting Bit 0 to zero disables only the burst size configuration mechanism so that the read transactions are passed along in traditional PCI fashion without an indication of burst transfer size.

Tables 7-24 mirror tables 1-6 and describe the configuration registers of windows 1, 2 and 3. The inclusion of four windows enables applications using the PCI bus to configure four different burst transfer sizes. For example, in contrast to a traditional PCI bus in which the default sizing rules suppose all read transactions to require 64 bytes at a request, the first window in the configurable burst transfer size PCI bus may be configured to 128 bytes at a request, the second window may be configured to 256 bytes, the third to 512 and the fourth to 1024. Applications may then address read transactions to the appropriate window based on factors such as the amount of data required, the speed at which data needs to be obtained, the priority of the application, etc.

Read transactions addressed within the memory map of the PCI bus may be decoded by logic similar to that set forth below:

If {[(PCI_Bus_addr>=PCI_Burst_Sizing_Window_0) && (PCI_Bus_addr<=PCI_Burst_Sizing_Window_Limit_0)&& PCI_Burst_Sizing_Window_Control_0_transfer_ sizing_enable] or

[(PCI_Bus_addr>=PCI_Burst_Sizing_Window_1) && (PCI_Bus_addr<=PCI_Burst_Sizing_Window_Limit_1)&& PCI_Burst_Sizing_Window_Control_1_transfer_ sizing_enable] or

[(PCI_Bus_addr>=PCI_Burst_Sizing_Window_2) && (PCI_Bus_addr<=PCI_Burst_Sizing_Window_

Limit_2)&& PCI_Burst_Sizing_Window_Control_2_transfer_sizing_enable] or
[(PCI_Bus_addr>=PCI_Burst_Sizing_Window_3) && (PCI_Bus_addr<=PCI_Burst_Sizing_Window_Limit_3)&& PCI_Burst_Sizing_Window_Control_3_transfer_sizing_enable]}

Then translate these memory read transactions with correct programmed burst size.

Additional error checking may be included in the address decoding logic for the PCI bus memory map as desired, checking for incorrectly configured windows. For example, the address decoding logic may check for and flag or correct overlapping windows or other improper or even inefficient configurations as desired. Table 25 below describes a number of exemplary programming cases.

TABLE 25

Exemplary window programming cases

| Case | Window | Window base addr | Window upper limit | Resulting Upper address | Burst size | Pci addr |
|------|--------|------------------|--------------------|-----------------------|------------|----------|
| 1  | 0 | 0xA000_0000 | 0x0100_0000 | 0xA100_0000 | 64 B   | 0xA001_0000 |
| 2  | 1 | 0xB000_0000 | 0x0100_0000 | 0xB100_0000 | 128 B  | 0xB001_0000 |
| 3  | 2 | 0xC000_0000 | 0x0100_0000 | 0xC100_0000 | 512 B  | 0xC001_0000 |
| 4  | 3 | 0xD000_0000 | 0x0100_0000 | 0xD100_0000 | 1024 B | 0xD001_0000 |
| 5  | 0 | 0xA000_0000 | 0x0100_0000 | 0xA100_0000 | 64 B   | 0xA200_0000 |
| 6  | 1 | 0xB000_0000 | 0x0100_0000 | 0xB100_0000 | 128 B  | 0xB200_0000 |
| 7  | 2 | 0xC000_0000 | 0x0100_0000 | 0xC100_0000 | 512 B  | 0xC200_0000 |
| 8  | 3 | 0xD000_0000 | 0x0100_0000 | 0xD100_0000 | 1024 B | 0xD200_0000 |
| 9  | 0 | 0xA000_0000 | 0x0100_0000 | 0xA100_0000 | 64 B   | 0xA0FF_FFFC |
| 10 | 1 | 0xA100_0000 | 0x0100_0000 | 0xA200_0000 | 128 B  | 0xA1FF_FFFC |
| 11 | 2 | 0xA200_0000 | 0x0100_0000 | 0xA300_0000 | 512 B  | 0xA2FF_FFFC |
| 12 | 3 | 0xA300_0000 | 0x0100_0000 | 0xA400_0000 | 1024 B | 0xA3FF_FFFC |

Cases 1-4 configure the four windows at base addresses 0xA000_0000, 0xB000_0000, 0xC000_0000 and 0xD000_0000, each with a window length of 0x0100_0000 and burst sizes of 64B, 128B, 512B and 1024B. Thus the four windows are configured with various burst transfer sizes and in non-overlapping regions of the memory map. Exemplary read transactions are addressed at 0xA001_000, 0xB001_000, 0xC001_000 and 0xD001_000, falling entirely within the four windows. The transactions of cases 1-4 are therefore error free and may be decoded and processed without problems.

Cases 5-8 configure the four windows in the same manner as cases 1-4, but the exemplary read transactions are addressed outside of the windows. The read transactions are therefore faulty considered from a strict programming point of view in one particular embodiment, but if they fall within the PCI protocol address mapping they may be processed according to traditional PCI bus protocols and passed along without size indications or with a device specific guess of the size if the non-PCI bus needs a read length.

Cases 9-12 configure the four windows differently than the previous cases 1-8, with the four windows at base addresses 0xA000_0000, 0xA100_0000, 0xA200_0000 and 0xA300_0000, each with a window length of 0x0100_0000 and burst sizes of 64B, 128B, 512B and 1024B. The read transactions are addressed just one word from the end of each of the four windows. Thus, after one data-word of each read transaction, the addresses will spill from the original window (e.g., window0 in case 9) into the next window (e.g., window1 in case 9). In one particular embodiment, if the system is operating in a relaxed mode it will continue to function and read transactions will merely continue into the address space of the next window. If the system is operating in a strict mode it will error out. The burden is on application drivers to make sure that other applications are not using the overlapped address range, because in relaxed mode it will cause data conflicts, overwriting data of other applications.

Figure 6:
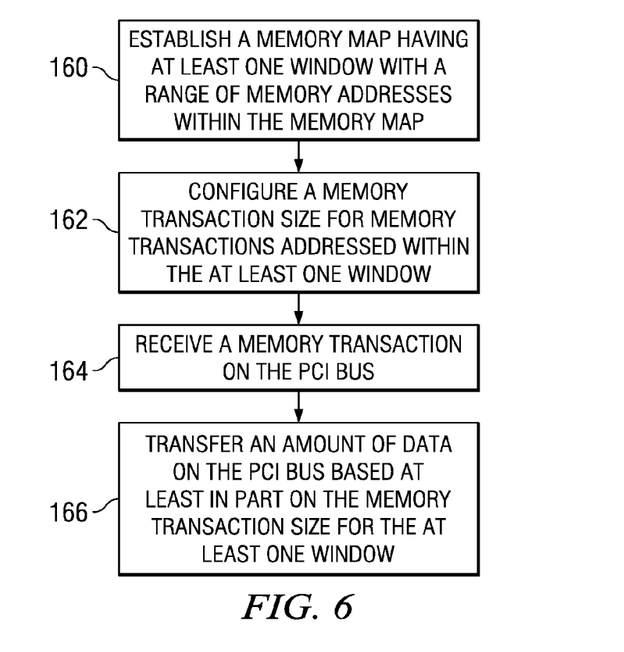
FIG. 6 is a flow chart of a method of transferring data on a PCI bus in accordance with some embodiments of the present invention.

Turning now to FIG. 6, an exemplary method of transferring data in a system having a PCI bus with burst transfer sizing will be summarized. A memory map is established having at least one window, with windows encompassing address ranges within the memory map. (Block 160) The windows may be governed by control registers that are set by applications associated with devices on the PCI bus. Memory transaction sizes are configured for memory transactions addressed within the windows. (Block 162) Again, the configuration may be performed by applications, and applications may reconfigure windows as desired, although programmers should take care not to reconfigure windows that are being used by other applications. In other particular embodiments, the windows may be configured by the system firmware, such as the BIOS, or by the operating system or other entities, or by a combination of multiple entities working together. When a memory transaction is received on the PCI bus and passed along to a device on the PCI bus or on another bus via a bridge (Block 164), data is transferred on the PCI bus with the amount of data based at least in part on the memory transaction size for the window. (Block 166)

In conclusion, the present invention provides novel systems, methods and apparatuses for configuring the burst transfer size of a PCI bus. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. An apparatus for transferring data, the apparatus comprising:
    a PCI bus;
    a memory map for memory transactions performed on the PCI bus; and
    at least one set of control registers adapted to establish at least one window within the memory map, the at least one set of control registers containing an address range for the at least one window within the memory map and a burst transfer size for memory transactions taking place on the PCI bus that are addressed within the address range.

2. The apparatus of claim 1, further comprising:
a second bus, wherein the second bus has a non-PCI protocol in which a size for memory transactions may be specified; and
a bridge device between the PCI bus and the second bus, wherein the bridge device specifies the size for the memory transactions on the second bus based at least in part on values stored in the at least one set of control registers.

3. The apparatus of claim 2, wherein the at least one set of control registers are located in the bridge device.

4. The apparatus of claim 1, the at least one set of control registers comprising a base address register for each said at least one window.

5. The apparatus of claim 1, the at least one set of control registers comprising an upper limit address register for each said at least one window, the upper limit address register being adapted to establish a length of each said at least one window.

6. The apparatus of claim 1, the at least one set of control registers comprising a burst size control register for each said at least one window.

7. The apparatus of claim 6, the burst size control register for each said at least one window comprising at least one field indicating a quantity of data to be read.

8. The apparatus of claim 7, the burst size control register for each said at least one window further comprising a transfer mode selector being adapted to select between a plurality of different size multiplier modes.

9. The apparatus of claim 6, the burst size control register for each said at least one window further comprising an enable flag being adapted to enable and disable applying burst size configuration for the memory transactions.

10. The apparatus of claim 1, the at least one set of control registers comprising four sets of control registers being adapted to establish four windows within the memory map for the memory transactions performed on the PCI bus.

11. A method of transferring data on a PCI bus, the method comprising:
establishing a memory map having at least one window, the at least one window having a range of memory addresses within the memory map;
configuring a memory transaction size for memory transactions addressed within the at least one window;
receiving a memory transaction on the PCI bus; and
transferring an amount of data on the PCI bus based at least in part on the memory transaction size for the at least one window.

12. The method of claim 11, the memory transaction comprising a read operation.

13. The method of claim 12, wherein the read operation is addressed within the at least one window in the PCI memory map, and wherein the transferring comprises a bridge from the PCI bus to a non-PCI bus specifying a size of the read operation to the non-PCI bus based at least in part on the memory transaction size configured for the at least one window.

14. The method of claim 13, wherein the non-PCI bus comprises a PCI Express bus.

15. The method of claim 11, wherein the configuring comprises storing a value in a base address register establishing a lower address for an address range of the at least one window.

16. The method of claim 11, wherein the configuring comprises storing a value in an upper limit register establishing a size of the at least one window.

17. The method of claim 11, wherein the configuring comprises storing a value in a burst size control register, the burst size control register comprising a burst size multiplier, an enable bit and a transfer mode comprising a fixed mode for the burst size multiplier wherein a predetermined block size is multiplied by the burst size multiplier and a cache line size dependent mode wherein a cache line size is multiplied by the burst size multiplier.

18. The method of claim 11, the configuring comprising a software application associated with a device connected to the PCI bus communicating with a BIOS in a computer system to store values in a plurality of control registers for the PCI bus.

19. The method of claim 11, further comprising decoding an address of the memory transaction to determine whether the memory transaction is addressed within the at least one window.

20. A computer system comprising:
a PCI bus;
a plurality of PCI bus burst transfer size control registers adapted to establish a size of burst transfer operations taking place within an address range of a memory map for the PCI bus, the plurality of burst transfer size control registers comprising a base address register specifying a base address for the address range, an upper limit register specifying an upper address limit for the address range, and a burst size control register, the burst size control register comprising a burst size multiplier, a transfer mode flag, and an enable bit, wherein the transfer mode flag selects between a fixed data size to be multiplied by the burst size multiplier or a cache line size to be multiplied by the burst size multiplier, and wherein the enable bit enables or disables burst transfer size specifications on the PCI bus;
a second bus; and
a bridge device between the PCI bus and the second bus, wherein the bridge device is adapted to specify read transaction sizes to the second bus for memory transactions passing through the bridge device from the PCI bus to the second bus, the read transaction sizes being based at least in part on the contents of the plurality of PCI bus burst transfer size control registers.

* * * * *